F. E. HENRY.
FURNITURE LEVELING DEVICE.
APPLICATION FILED JUNE 21, 1921.
1,435,606.  
Patented Nov. 14, 1922.
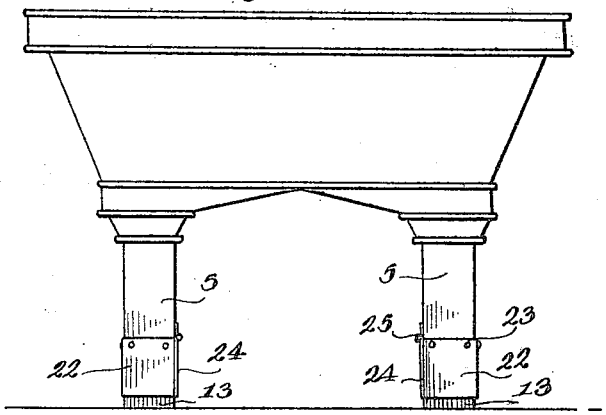
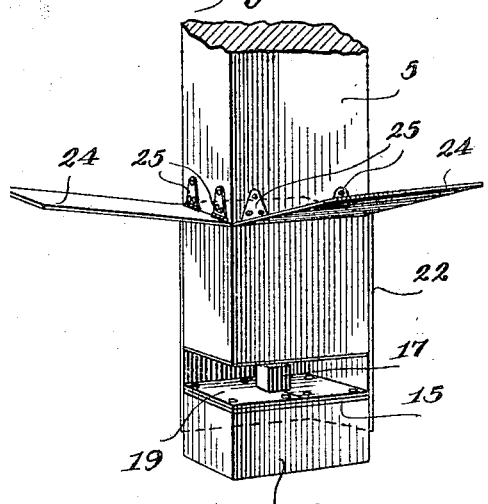
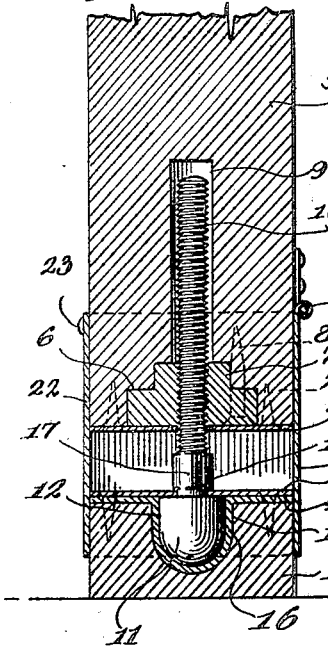
Inventor  
Floyd E. Henry.  
By Marks Ammerman  
Attorney Patented Nov. 14, 1922.

1,435,606

UNITED STATES PATENT OFFICE.

FLOYD E. HENRY, OF SALINA, KANSAS.

FURNITURE-LEVELING DEVICE.

Application filed June 21, 1921. Serial No. 479,327.

*To all whom it may concern:*

Be it known that I, FLOYD E. HENRY, a citizen of the United States of America, and resident of Salina, in the county of Saline and State of Kansas, have invented certain new and useful Improvements in Furniture-Leveling Devices, of which the following is a specification.

This invention relates to furniture, and particularly to means for leveling a table, the said device including means by which the mechanical elements employed in leveling the table may be hidden or screened from view, so that the appearance of the legs of the furniture is not marred.

It is furthermore an object of this invention to produce a leveling device in which the operating parts are shielded from moisture or water which might be employed in cleaning the floor around the legs of the furniture, and in which the operating parts of the device are shielded from dust or foreign substances which might interfere with the operation of the device.

It is a still further object of this invention to produce a leveling device of the character indicated having joints which are not liable to develop lost motion in use.

A still further object of this invention is to produce a table leveling device comprising comparatively few inexpensive parts which will prove efficient and satisfactory in use.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates an end elevation of a billiard table showing a shield applied thereto;

Figure 2 illustrates an enlarged perspective view of a fragment of the leg, showing the device embodying the invention applied thereto; and Figure 3 illustrates a sectional view of the said leg.

In these drawings 5 denotes the leg which is stationary with respect to the table structure having a shouldered seat 6 in its lower end to receive a nut 7, the said nut being secured in place by fastenings 8 such as screws. The leg 5 furthermore has a channel 9 constituting a clearance for a screw 10 which is threaded through the nut and made adjustable for the purpose of leveling the table.

The screw has a convex head 11, but the sides of the head are straight as shown at 12 in order to guard against oscillatory motion of the head which might result in impairing the stability or rigidity of the structure when the parts are assembled, as will presently appear.

A base 13 has a recess 14 in its upper face. A face plate 15 has a socket 16 conforming to the contour of the seat 14, and its inner wall conforms to the contour of the head of the screw so that the socket forms a bearing in which the head of the screw is rotatable in accomplishing the adjustment heretofore mentioned. The shank of the screw at or about its point of juncture with the head is provided with shoulders 17 which serve as wrench engaging portions by which the screw may be manipulated, and there is an annular seat 18 between the said shouldered portion and the head in which the edges of the plates 19 may fit to prevent the access of foreign substances between the head of the screw and the socket in which it works. The lower end of the leg 5 is also supplied with a plate 20 secured thereto by fastenings 21 such as screws, which serves to prevent the access of dust and moisture to the nut.

It will be observed that when the legs of a table are supplied with leveling devices such as described, the screw may be manipulated, and owing to the firm bearing of the head in the socket of the base, there is no liability of vibratory motion of the leg with relation to the base, and of course, when a device of this kind is used in billiard tables and the like, stability is of prime importance.

The screws will serve to support the leg portions in spaced relation to the bases, and it is desirable to cover or shield this opening which otherwise would be unsightly, and if unguarded the space would become fouled by the accumulation of dust and foreign substances.

In the present embodiment of the invention, the space is covered by plates such as 22 which may be secured to the leg by fastenings such as 23, and this plate may telescope with relation to the base. The plate or plates 22 may embrace the corners and cover two or more sides, and a door or doors such as 24 may be mounted on hinges 25 attached to each leg, the said doors serving to cover the space between the end of the leg and the base. Of course the inventor does not wish to be limited with respect to the number of sides that should be covered with plates or the number that should have doors, as that is well within the skill of a mechanic.

I claim:

1. In a leveling device for furniture, legs having recesses in their ends, a nut secured in the recess, a screw threaded through the nut, the said screw having a head with a convex end and straight sides, a base block having a seat, a face plate on the said base block having a socket conforming to the contour of the seat and fitting therein, the contour of the socket conforming to the contour of the head of the screw which rests in the said socket, and means on the screw accessible between the end of the leg and the top of the base block to be engaged by a tool for turning the screw.

2. In a leveling device for furniture, legs having recesses in their ends, a nut secured in the recess, a screw threaded through the nut, the said screw having a head with a convex end, a base block having a seat of the configuration of the end of the head, shoulders near the junction of the screw and its head and an annular channel between the said shoulder and head, a shield on the said block covering the joint between the head and the socket of the block and extending into the said annular channel, and means for securing said plate to the block, and a shield secured to each leg spanning the space between the leg and the block and telescopic with relation to the block.

FLOYD E. HENRY.